(12) United States Patent
Kitagawa et al.

(10) Patent No.: US 12,534,774 B2
(45) Date of Patent: Jan. 27, 2026

(54) HIGH-STRENGTH STEEL SHEET, ELECTROGALVANIZED STEEL SHEET, HOT-DIP GALVANIZED STEEL SHEET, ALLOYED HOT-DIP GALVANIZED STEEL SHEET, AND MANUFACTURING METHODS OF THESE

(71) Applicant: Kobe Steel, Ltd., Kobe (JP)

(72) Inventors: Toma Kitagawa, Kobe (JP); Toshio Murakami, Kobe (JP); Kosuke Shibata, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 388 days.

(21) Appl. No.: 18/041,738

(22) PCT Filed: Aug. 12, 2021

(86) PCT No.: PCT/JP2021/029745
§ 371 (c)(1),
(2) Date: Feb. 15, 2023

(87) PCT Pub. No.: WO2022/050021
PCT Pub. Date: Mar. 10, 2022

(65) Prior Publication Data
US 2023/0295764 A1    Sep. 21, 2023

(30) Foreign Application Priority Data
Sep. 7, 2020    (JP) .................... 2020-150167

(51) Int. Cl.
*C21D 9/46*    (2006.01)
*C21D 8/02*    (2006.01)
*C22C 38/00*   (2006.01)
*C22C 38/02*   (2006.01)
(Continued)

(52) U.S. Cl.
CPC .......... *C21D 9/46* (2013.01); *C21D 8/0221* (2013.01); *C22C 38/001* (2013.01);
(Continued)

(58) Field of Classification Search
None
See application file for complete search history.

(56) References Cited

U.S. PATENT DOCUMENTS 11,466,337 B2    10/2022    Natsumeda et al.

FOREIGN PATENT DOCUMENTS

CN    108779533 A    11/2018
JP    2015218365 A  * 12/2015
(Continued)

OTHER PUBLICATIONS

Extended European Search Report issued on Dec. 19, 2023 in European Patent Application No. 21864079.5, 10 pages.
(Continued)

*Primary Examiner* — Anthony M Liang
(74) *Attorney, Agent, or Firm* — Oblon, McClelland, Maier & Neustadt, L.L.P.

(57) ABSTRACT

Disclosed is a high-strength steel sheet having predetermined chemical components, and microstructures of the steel sheet satisfies that: a fraction of MA in all steel microstructures being more than 0% and 15.0% or less by area ratio; a fraction of a soft α-phase microstructure in the all steel microstructures being 0% or more and 50% or less by area ratio; and a standard deviation of an equivalent circle diameter of retained austenite being greater than 0.155 μm.

10 Claims, 1 Drawing Sheet

(51) Int. Cl.
    *C22C 38/04*     (2006.01)
    *C22C 38/06*     (2006.01)
    *C23C 2/06*     (2006.01)
    *C23C 2/40*     (2006.01)
    *C25D 3/22*     (2006.01)

(52) U.S. Cl.
    CPC ............ *C22C 38/002* (2013.01); *C22C 38/02* (2013.01); *C22C 38/04* (2013.01); *C22C 38/06* (2013.01); *C23C 2/06* (2013.01); *C23C 2/40* (2013.01); *C25D 3/22* (2013.01); *C21D 2211/001* (2013.01)

(56) References Cited

FOREIGN PATENT DOCUMENTS

| | | |
|---|---|---|
| JP | 2018-204058 A | 12/2018 |
| JP | 6434348 B2 | 12/2018 |
| WO | WO 2020/080407 A1 | 4/2020 |
| WO | WO 2020/148948 A1 | 7/2020 |
| WO | WO 2020/162561 A1 | 8/2020 |

OTHER PUBLICATIONS

International Search Report mailed on Oct. 26, 2021 in PCT/JP2021/029745 filed on Aug. 8, 2021 (2 pages).

International Preliminary Report on Patentability and Written Opinion (with English Translation) issued Mar. 16, 2023, in PCT/JP2021/029475, (with English Translation), 10 pages.

\* cited by examiner

HIGH-STRENGTH STEEL SHEET, ELECTROGALVANIZED STEEL SHEET, HOT-DIP GALVANIZED STEEL SHEET, ALLOYED HOT-DIP GALVANIZED STEEL SHEET, AND MANUFACTURING METHODS OF THESE

CROSS-REFERENCE TO RELATED APPLICATIONS

The present application is the national stage of international application PCT/JP2021/029745, filed on Aug. 12, 2021, and claims the benefit of the filing date of Japanese Appl. No. 2020-150167, filed on Sep. 7, 2020, the content of each of which is incorporated by reference.

TECHNICAL FIELD

The present disclosure relates to a high-strength steel sheet, an electrogalvanized steel sheet, a hot-dip galvanized steel sheet and an alloyed hot-dip galvanized steel sheet that can be used for various applications including automobile parts, etc., and manufacturing methods of these.

BACKGROUND ART

A steel sheet (e.g., a cold-rolled steel sheet, an alloyed hot-dip galvanized steel sheet, etc.) used for automobile parts (e.g., frame parts), etc. are required to be thinner in order to improve fuel efficiency by reducing the weight of a vehicle body. In order to achieve thinning and ensure the strength of the parts, a high strength steel sheet is required. On the other hand, such a steel sheet is also required to have excellent workability in order to be formed into the parts with complex shapes. For example, Patent Document 1 discloses a high-strength steel sheet having a tensile strength (TS) of 980 MPa or more and excellent workability. Patent Document 2 discloses a high-strength steel sheet having a tensile strength (TS) of 980 MPa or more.

Conventional Art Document

Patent Document

Patent Document 1: JP 6434348 B
Patent Document 2: JP 2018-204058 A

DISCLOSURE OF THE INVENTION

Problems to be Solved by the Invention

Having high tensile strength (TS), excellent strength and ductility balance (TS×EL), high yield ratio (YR) and excellent hole expansion ratio (A) in various applications including automobile parts, etc. is required. Furthermore, uniform deformation (uniform elongation, uEL) is also required, because uneven deformation when an external force is applied may cause cracks to occur at the deformed portion(s). The conventional arts disclosed in Patent Documents 1 and 2 may not fully satisfy all these properties. Specifically, the following are required for each of the tensile strength, the strength ductility balance, the yield ratio, the uniform elongation, and the hole expansion ratio.

The tensile strength (TS) is required to be 780 MPa or more. Also, in order to increase the stress that can be applied during use, it is necessary to have high yield strength (YS) in addition to high tensile strength (TS). In addition, from the viewpoint of ensuring collision safety and the like, it is also necessary to increase the yield strength of the steel sheet. Therefore, specifically, yield ratio (YR=YS/TS) of 0.65 or more is required.

The total elongation (EL) is required to be 21% or more. In addition, with respect to the balance of strength and ductility, the product (TS×EL) of TS and the total elongation (EL) is required to be 20000 MPa·% or more. Furthermore, in order to ensure formability during forming into the parts, it is also required that the hole expansion ratio A, which indicates the hole expandability, is 20.0% or more. In addition, uEL of more than 13% is required so that uniform deformation (uniform elongation) can be achieved when an external force is applied.

The embodiments of the present invention have been made in view of such a situation, and an object thereof is to provide a high-strength steel sheet, an electrogalvanized steel sheet, a hot-dip galvanized steel sheet and an alloyed hot-dip galvanized steel sheet, of which all of the tensile strength (TS), the yield ratio (YR), the uniform elongation (uEL), the product (TS×EL) of TS and the total elongation (EL) and the hole expansion ratio (A) are at high level, and manufacturing methods of these.

Means for Solving the Problems

The present invention according to a first aspect provides a high-strength steel sheet, which includes:
 C: more than 0.15% by mass, 0.35% by mass or less,
 Si: more than 0% by mass, 3.0% by mass or less,
 Mn: 1.0% by mass or more, 4.0% by mass or less,
 Al: more than 0% by mass, 3.0% by mass or less,
 N: more than 0% by mass, 0.01% by mass or less,
 P: more than 0% by mass, 0.05% by mass or less,
 S: more than 0% by mass, 0.01% by mass or less, and
 total content of Si and Al: 0.5% by mass or more, 3.0% by mass or less, with the balance consisting of iron and inevitable impurities,
wherein microstructures of the steel sheet satisfies that:
 a fraction of MA in all steel microstructures is more than 0% and 15.0% or less by area ratio,
 a fraction of a soft $\alpha$-phase microstructure in the all steel microstructures is 0% or more and 50% or less by area ratio, and
 a standard deviation of an equivalent circle diameter of retained austenite is greater than 0.155 μm.

In a second aspect, the prevent invention provides the high-strength steel sheet according to the aspect 1, further including one or more selected from the group consisting of:
 Cu: more than 0% by mass, 0.50% by mass or less,
 Ni: more than 0% by mass, 0.50% by mass or less,
 Cr: more than 0% by mass, 0.50% by mass or less,
 Mo: more than 0% by mass, 0.50% by mass or less,
 B: more than 0% by mass, 0.01% by mass or less,
 V: more than 0.005% by mass, 0.05% by mass or less,
 Nb: more than 0% by mass, 0.05% by mass or less,
 Ti: more than 0% by mass, 0.05% by mass or less,
 Ca: more than 0% by mass, 0.05% by mass or less, and
 REM: more than 0% by mass, 0.01% by mass or less.

In a third aspect, the prevent invention provides an electrogalvanized steel sheet having an electrogalvanized layer on a surface of the high-strength steel sheet according to the aspect 1 or 2.

In a fourth aspect, the prevent invention provides a hot-dip galvanized steel sheet having a hot-dip galvanized layer on a surface of the high-strength steel sheet according to the aspect 1 or 2.

In a fifth aspect, the present invention provides an alloyed hot-dip galvanized steel sheet having an alloyed hot-dip galvanized layer on a surface of the high-strength steel sheet according to the aspect 1 or 2.

In a sixth aspect, the present invention provides a manufacturing method of a high-strength steel sheet, which includes:

preparing a rolled material having a chemical composition according to the aspect 1 or 2;

heating the rolled material to a temperature of (Ac3+30° C.) or higher to austenitize it;

after the austenitizing, cooling from (Ms+250° C.) to (Ms+110° C.) at an average cooling rate of 15° C./sec. or more and less than 200° C./sec. and then keeping at a cooling rate of 0° C./sec. or more and 10° C./sec. or less within the temperature range from (Ms+10° C.) to (Ms+110° C.) for 10 seconds or more and less than 300 seconds;

after the keeping, cooling from a temperature of (Ms+10° C.) or higher to a cooling stop temperature of less than Ms at an average cooling rate of 10° C./second or higher; and heating from the cooling stop temperature to a reheating temperature in the range of (Ms−100° C.) to (Ms+125° C.), wherein the Ac3 and the Ms are calculated by the following formulas:

$$Ac3(°\ C.)=910-203\times[C]^{1/2}-15.2\times[Ni]+44.7\times[Si]+104\times[V]+31.5\times[Mo]+13.1\times[W]-30\times[Mn]-11\times[Cr]-20\times[Cu]+700\times[P]+400\times[Al]+120\times[As]+400\times[Ti];\ \text{and}$$

$$Ms(°\ C.)=561-474\times[C]-33\times[Mn]-17\times[Ni]-17\times[Cr]-21\times[Mo],$$

wherein "[ ]" represents the content (% by mass) of each element, and the content of elements not included is zero.

In a seventh aspect, the present invention provides the manufacturing method of the high-strength steel sheet according to the aspect 6, further including:

after the heating to the reheating temperature, holding at the reheating temperature for 50 seconds or more and 1200 seconds or less.

In an eighth aspect, the present invention provides a manufacturing method of an electrogalvanized steel sheet, which includes:

applying electrogalvanizing to a surface of the high-strength steel sheet obtained by the method according to the aspect 6 or 7.

In a ninth aspect, the present invention provides a manufacturing method of a hot-dip galvanized steel sheet, which includes:

applying hot-dip galvanizing to a surface of the steel sheet during the heating at the reheating temperature according to the aspect 6 or 7.

In a tenth aspect, the present invention provides a manufacturing method of an alloyed hot-dip galvanized steel sheet, which includes:

heating for alloying after the hot-dip galvanizing according to the aspect 9.

Effects of the Invention

According to embodiments of the present invention, it is possible to a high-strength steel sheet, an electrogalvanized steel sheet, a hot-dip galvanized steel sheet and an alloyed hot-dip galvanized steel sheet, of which all of the tensile strength (TS), the yield ratio (YR), the uniform elongation (uEL), the product (TS×EL) of TS and the total elongation (EL) and the hole expansion ratio (A) are at high level, and manufacturing methods of these.

MODE FOR CARRYING OUT THE INVENTION

As a result of intensive studies by the present inventors, it has been found that a high-strength steel sheet, an electrogalvanized steel sheet, a hot-dip galvanized steel sheet and an alloyed hot-dip galvanized steel sheet, of which all of the tensile strength (TS), the yield ratio (YR), the uniform elongation (uEL), the product (TS×EL) of TS and the total elongation (EL) and the hole expansion ratio (A) are at high level, can be obtained by making a steel having the predetermined chemical component to have microstructures characterized by that: a fraction of MA in all steel microstructures being more than 0% and 15.0% or less by area ratio; a fraction of a soft α-phase microstructure in the all steel microstructures being 0% or more and 50% or less by area ratio; and a standard deviation of an equivalent circle diameter of retained austenite being greater than 0.155 μm. In particular, the present inventors have found that both the total elongation (EL) and the uniform elongation (uEL) can be improved by making the standard deviation of the equivalent circle diameter of retained austenite more than 0.155 μm.

1. Steel Microstructures

Details of steel microstructures of the high-strength steel sheet according to the embodiments of the present invention will be described below.

The explanation of the steel microstructures below may explain a mechanism(s) by which various properties can be improved by having such a microstructure. The mechanism(s) is considered by the present inventors based on the knowledge currently available, but it should be noted that the mechanism(s) does not limit the scope of the present invention.

(1) Fraction of MA: More than 0% and 15.0% or Less

MA is a hard phase. The vicinity of the matrix/hard phase interface acts as a void formation site during deformation. MA according to the embodiments of the present invention is an abbreviation for "martensite-austenite constituent", which is a mixed microstructure of untempered martensite and retained austenite. When a fraction of MA increases, strain concentration occurs at the matrix/hard phase interface, and fracture tends to occur starting from the void formed in the vicinity of the matrix/hard phase interface. In addition, MA decreases the yield ratio (YR) due to mobile dislocation introduced during MA formation.

Therefore, the yield ratio (YR) and the hole expansion ratio λ can be improved by setting the fraction of MA in all steel microstructures to 15.0% or less. The fraction of MA is preferably 8% or less. Since the presence of MA causes variations in mechanical properties, the desired A may be satisfied even if the fraction of MA does not satisfy 15.0% or less. However, in order to stably obtain the desired A, the fraction of MA should be 15.0% or less.

On the other hand, retained austenite, which constitutes MA, undergoes a TRIP phenomenon in which it transforms into martensite due to deformation-induced transformation during working such as press working, resulting in a high work hardening rate. Therefore, since MA has an effect of improving uniform elongation (uEL) and total elongation (EL), the fraction of MA should be more than 0%. The fraction of MA is preferably 3% or more, more preferably 5% or more.

(2) Fraction of Soft α-Phase Microstructure: 0% or More and 50% or Less

When a soft α-phase microstructure is included, ductility improves, but strength decreases. In addition, strain concentration occurs at the matrix/soft α-phase interface, and fracture tends to occur starting from voids formed in the vicinity of the matrix/soft α-phase interface. Therefore, the yield ratio (YR) and the hole expansion ratio A can be improved by setting the fraction of the soft α-phase microstructure in all steel microstructures to 50% or less. The fraction of the soft α-phase microstructure is preferably 40% or less, more preferably 30% or less, and most preferably 0%.

As used herein, the term "α-phase" refers to a crystal structure of bcc. For example, the above "α-phase" includes ferrite, pearlite, tempered bainite, tempered bainite, unquenched bainite, untempered martensite contained in MA, and the like. The "α-phase" can be identified using an EBSD (Electron Back Scatter Diffraction Patterns) method, which is a crystal analysis method using SEM (Scanning Electron Microscope), as described later.

In this specification, the "soft α-phase" refers to, as shown in Examples below, crystal grains having GAM (Grain Average Misorientation) value of less than 0.4 among crystal grains identified as α-phase by EBSD. GAM is the average value of the misorientation between adjacent pixels within one crystal grain. The soft α-phase micostructure is considered to have a low dislocation density and a small misorientation within one crystal grain. In the embodiments of the present invention, among the α-phases, a soft microstructure having a low dislocation density as described above is defined as the soft α-phase microstructure. If the fraction of the soft α-phase microstructure is 0% or more and 50% or less, the effects of the embodiments of the present invention are exhibited even if microstructures other than the soft α-phase in the "α-phase" are included.

(3) Standard Deviation of Equivalent Circle Diameter of Retained Austenite: More than 0.155 μm Retained austenite causes a TRIP phenomenon in which it transforms into martensite due to deformation-induced transformation during working such as press working, and large elongation can be obtained. Retained austenite has different stabilities depending on its size. The more various sizes of retained austenite are included, the more work hardening during deformation persists up to high strains. Therefore, by setting the standard deviation of the equivalent circle diameter of retained austenite to more than 0.155 μm, the total elongation (EL) and the uniform elongation (uEL) can be improved. The standard deviation of the equivalent circle diameter of retained austenite is preferably more than 0.158 μm, more preferably more than 0.161 μm. On the other hand, when retained austenite of excessively diverse sizes is included, the proportion of too large sized retained austenite that is unstable and does not contribute to the improvement of the total elongation (EL) and the uniform elongation (uEL) increases, and the total elongation (EL) and the uniform elongation (uEL) may decrease. Therefore, the standard deviation of the equivalent circle diameter of retained austenite is preferably 1.000 μm or less, more preferably 0.500 μm or less.

In addition, the too large sized retained austenite is unstable and may not contribute to improvement of the total elongation (EL) and the uniform elongation (uEL). Therefore, the average equivalent circle diameter of retained austenite is preferably 1.0 μm or less. As described above, since MA in the embodiments of the present invention is a mixed microstructure of untempered martensite and retained austenite, an area ratio of retained austenite is equal to or less than a fraction of MA.

(4) Other Steel Microstructures

The steel microstructures according to the embodiments of the present invention does not specifically define the steel microstructures other than the above-described MA, soft α-phase microstructure, and retained austenite. However, even if microstructures other than MA or the like exist, the effects of the embodiments of the present invention are exhibited as long as the above-described microstructure requirements are satisfied.

2. Chemical Composition

The chemical composition of the high-strength steel sheet according to the embodiments of the present invention will be described below. First, basic elements will be explained, and then elements that can be selectively added will be explained.

(1) C: More than 0.15% by Mass and 0.35% by Mass or Less

C is an essential element for obtaining the desired microstructures and ensuring properties such as high (TS×EL). In order to effectively exhibit such effects, the content of C needs be more than 0.15% by mass. However, if it exceeds 0.35% by mass, it is not suitable for welding and sufficient welding strength cannot be obtained. The content of C is preferably 0.18% by mass or more, more preferably 0.20% by mass or more. Also, it is preferably 0.30% by mass or less, more preferably 0.25% by mass or less. When the content of C is preferably 0.30% by mass or less as described above, welding can be performed more easily.

(2) Si: More than 0% by Mass and 3.0% by Mass or Less

Si is an effective element for improving the temper softening resistance. In addition, Si is an element that is also effective in improving the strength through solid-solution strengthening. From the viewpoint of effectively exhibiting these effects, the content of Si is over than 0% by mass. Preferably, it is 0.02% by mass or more. However, since Si is a ferrite-forming element, if it is included in a large amount, the hardenability is impaired, making it difficult to ensure high strength. It also adversely affects the LME (Liquid Metal Embrittlement) susceptibility. Therefore, the content of Si is set to 3.0% by mass or less. The content is preferably 2.5% by mass or less, more preferably 2.0% by mass or less, and even more preferably 1.95% by mass or less.

(3) Al: More than 0% by Mass and 3.0% by Mass or Less

Al acts as a deoxidizing agent and also has an effect of improving the corrosion resistance of steel. In order to sufficiently exhibit these effects, the content of Al should be over than 0% by mass. The content is preferably 0.030% by mass or more, more preferably 0.040% by mass or more. However, since Al is a ferrite-forming element, if contained in a large amount, the hardenability is impaired, making it difficult to ensure high strength. Therefore, the content of Al is set to 3.0% by mass or less. The content is preferably 2.5% by mass or less, more preferably 2.0% by mass or less, and even more preferably 1.95% by mass or less.

(4) Total Content of Si and Al: 0.5% by Mass or More and 3.0% by Mass or Less

Si and Al each acts to suppress the precipitation of cementite and to promote the formation of retained austenite. In order to effectively exhibit such actions, the total content of Si and Al should be 0.5% by mass or more. The content is preferably 0.7% by mass or more, more preferably 1.0% by mass or more. However, if the total content of Si and Al exceeds 3.0% by mass, the deformability of the steel deteriorates and TS×EL decreases. Therefore, the total content of Si and Al should be 3.0% by mass or less. The content is preferably 2.5% by mass or less, more preferably 2.0% by mass or less, and even more preferably 1.95% by mass or less.

(5) Mn: 1.0% by Mass or More and 4.0% by Mass or Less

Mn suppresses the formation of ferrite. In order to effectively exhibit such an effect, the content of Mn should be 1.0% by mass or more. Preferably, it is 1.5% by mass or more. However, if it exceeds 4.0% by mass, bainite transformation cannot be suppressed and relatively coarse retained austenite cannot be formed (that is, the standard deviation of the equivalent circle diameter of retained austenite cannot be increased), and, adversely affects the LME susceptibility. Therefore, the content of Mn is set to 4.0% by mass or less. It is preferably 3.0% by mass or less, more preferably 2.5% by mass or less, and still more preferably 2.2% by mass or less.

(6) N: More than 0% by Mass and 0.01% by Mass or Less

If the content of N is excessive, the amount of precipitated nitrides increases, which adversely affects the toughness. Therefore, the content of N is set to 0.01% by mass or less. The content of N is preferably 0.008% by mass or less, more preferably 0.006% by mass or less. Considering the cost of steelmaking, etc., the content of N is usually 0.001% by mass or more.

(7) P: More than 0% by Mass and 0.05% by Mass or Less

P is inevitably present as an impurity element. The presence of P exceeding 0.05% by mass deteriorates the total elongation (EL) and the hole expansion ratio ($\lambda$). Therefore, the content of P is set to 0.05% by mass or less. Preferably, it is 0.03% by mass or less.

(8) S: More than 0% by Mass and 0.01% by Mass or Less

S inevitably exists as an impurity element. The presence of S exceeding 0.01% forms sulfide-based inclusions such as MnS, which act as starting points for cracks and lower the hole expansion ratio ($\lambda$). Therefore, the content of S is set to 0.01% by mass or less. Preferably, it is 0.005% by mass or less.

(9) Balance

The balance is Fe and inevitable impurities. As inevitable impurities, trace elements (for example, As, Sb, Sn, etc.) brought in depending on the conditions of raw materials, materials, manufacturing equipment, etc. are allowed. In the embodiments of the present invention, 0.005% by mass or less of V may inevitably be contained. That is, in the embodiments of the present invention, 0.005% by mass or less of V is treated as an inevitable impurity. For example, there are elements, such as P and S, whose contents are generally preferably as low as possible and thus are inevitable impurities, but whose content ranges are separately defined as described above. For this reason, in this specification, the term "inevitable impurities" constituting the balance is a concept excluding elements whose content ranges are separately defined.

Any other element may be further included as long as the properties of the high-strength steel sheet according to the embodiment of the present invention can be maintained. Other elements that can be so selectively included are exemplified below.

(10) Other Elements

Cu: more than 0% by mass, 0.50% by mass or less, Ni: more than 0% by mass, 0.50% by mass or less, Cr: more than 0% by mass, 0.50% by mass or less, Mo: more than 0% by mass, 0.50% by mass or less, B: more than 0% by mass, 0.01% by mass or less, V: more than 0.005% by mass, 0.05% by mass or less, Nb: more than 0% by mass, 0.05% by mass or less, Ti: more than 0% by mass, 0.05% by mass or less, Ca: more than 0% by mass, 0.05% by mass or less, and REM: more than 0% by mass, 0.01% by mass or less Cu, Ni, Cr, Mo and B improve the hardenability, prevent the ferrite formation, and contribute to the austenite stabilization and/or the bainite refinement, thereby improving the strength-ductility balance. It is recommended that each content of Cu, Ni, Cr and Mo is preferably greater than 0% by mass, more preferably 0.05% by mass or more, and even more preferably 0.1% by mass or more. It is recommended that the content of B is preferably 0% by mass, more preferably 0.0001% by mass or more, and even more preferably 0.0002% by mass or more. However, if these elements are contained excessively, the workability deteriorates and the cost increases. It is recommended that each content of Cu, Ni, Cr and Mo is preferably 0.50% by mass or less, more preferably 0.40% by mass or less, and even more preferably 0.30% by mass or less. It is recommended that the content of B is preferably 0.01% by mass or less, more preferably 0.0075% by mass or less, and even more preferably 0.005% by mass or less, and even more preferably 0.003% by mass or less.

V, Nb and Ti improve the strength-ductility balance by increasing the strength without greatly deteriorating the ductility by precipitation-strengthening the matrix phase. It is recommended that the content of V is preferably more than 0.005% by mass, more preferably 0.01% by mass or more, and even more preferably 0.02% by mass or more. It is recommended that each content of Nb and Ti is preferably more than 0% by mass, more preferably 0.005% by mass or more, still more preferably 0.01% by mass or more, and still more preferably 0.02% by mass or more. However, if these elements are contained excessively, the workability deteriorates. Thus, it is desirable that each content of these elements is preferably 0.05% by mass or less, more preferably 0.04% by mass or less, and even more preferably 0.03% by mass or less.

Ca and REM finely disperse inclusions typified by MnS, thereby contributing to the strength-ductility balance and the improvement of the hole expandability. Here, examples of REM (rare earth element) used in the embodiments of the present invention include Sc, Y and lanthanoids. It is desired that each content of Ca and REM is preferably more than 0% by mass, more preferably 0.001% by mass or more, and even more preferably 0.002% by mass or more. However, even if these elements are excessively contained, the effect is saturated and it is economically wasteful. Therefore, the content of Ca is preferably 0.05% by mass or less, and the content of REM is 0.01% by mass or less. Furthermore, it is more preferable that each content of Ca and REM is 0.005% by mass or less.

3. Properties

As described above, the high-strength steel sheet according to the embodiment of the present invention has high levels of TS, YR, uEL, EL, TS×EL and $\lambda$. These properties of the high-strength steel sheet according to the embodiments of the present invention are described in detail below.

(1) Tensile Strength (TS)

TS is 780 MPa or more. This ensures sufficient strength. TS is preferably 850 MPa or more, more preferably 900 MPa or more, and still more preferably 950 MPa or more.

(2) Yield Ratio (YR)

YR is 0.65 or more. As a result, high yield strength can be achieved in combination with the above-mentioned high tensile strength, and the final product obtained by processing such as deep drawing can be used under high stress. Preferably, YR is 0.67 or more, more preferably 0.70 or more.

(3) Total Elongation (EL)

EL is 21% or more. Thereby excellent workability such as press workability can be obtained. EL is preferably 22% or more, more preferably 22.6% or more.

(4) Uniform Elongation (uEL)

uEL is more than 13%. Thereby, the steel plate can be uniformly deformed when an external force is applied. uEL is preferably 13.5% or more, more preferably 15% or more.

(5) Product of TS and EL (TS×EL)

TS×EL is 20000 MPa/% or more. By having TS×EL of 20000 MPa % or more, it is possible to obtain a high level of strength-ductility balance, which simultaneously has high strength and high ductility. TS×EL is preferably 21000 MPa·% or more, more preferably 22000 MPa % or more.

(6) Hole Expansion Ratio ($\lambda$)

$\lambda$ is 20.0% or more. Thereby, excellent workability such as press workability can be obtained. It is preferably 25.0% or more, more preferably 29.0% or more.

Even an electro-galvanized steel sheet having an electro-galvanized layer on the surface of the high-strength steel sheet according to the embodiment of the present invention can obtain the above desired properties. The galvanizing amount is not particularly limited, and may be, for example, about 10 to 100 g/m$^2$ per one side. Even with a hot-dip galvanized steel sheet having a hot-dip galvanized layer on the surface of the high-strength steel sheet according to the embodiment of the present invention, the above desired properties can be obtained. The galvanizing amount is not particularly limited, and may be, for example, about 10 to 100 g/m$^2$ per one side. The above-described desired properties can be obtained even with an alloyed hot-dip galvanized steel sheet having an alloyed hot-dip galvanized layer on the surface of the high-strength steel sheet according to the embodiment of the present invention. The galvanizing amount is not particularly limited, and may be, for example, about 10 to 100 g/m$^2$ per one side.

4. Manufacturing Method

Next, a method for manufacturing the high-strength steel sheet according to the embodiments of the present invention will be described. The inventors of the present invention have found to obtain the high-strength steel sheet having the above-described desired steel microstructures and, as a result, having the above-described desired properties by subjecting a rolled material having the predetermined chemical composition to the heat treatment which will be described later in detail. In particular, the present inventors controlled the standard deviation of the equivalent circle diameter of retained austenite to more than 0.155 μm by appropriately controlling the keeping time in the predetermined temperature range based on the Ms point in the heat treatment described later. As a result, they have found that the above problems can be solved. The details are explained below.

Figure 1:
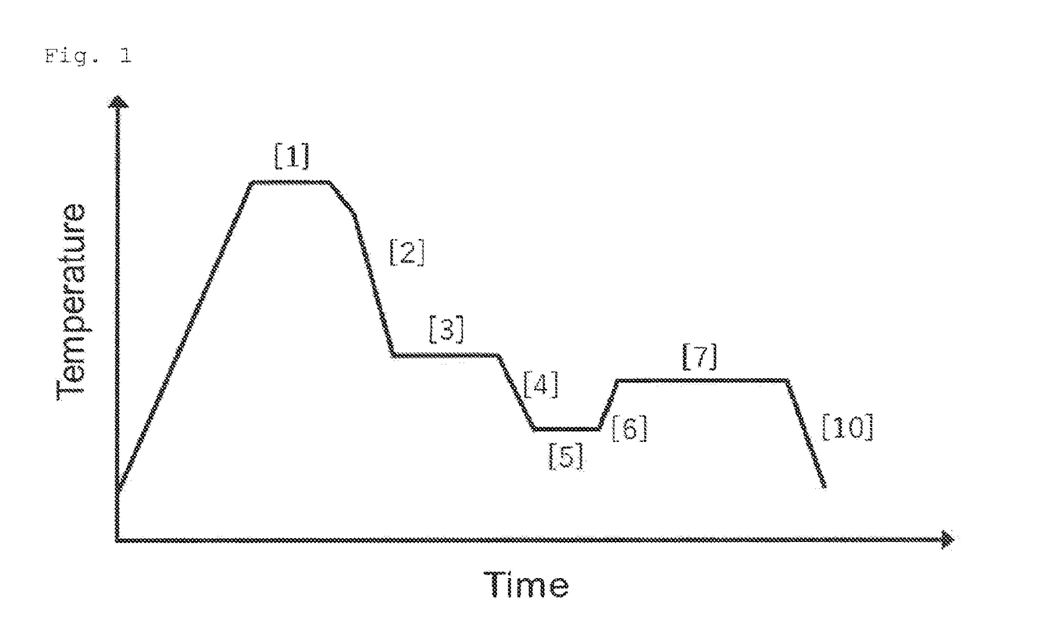
FIG. 1 is a diagram showing an example of a heat treatment pattern according to an embodiment of the present invention.

FIG. 1 is a diagram illustrating a method for manufacturing a high-strength steel sheet, particularly a heat treatment, according to an embodiment of the present invention.

A rolled material subjected to a heat treatment is usually manufactured by cold rolling after hot rolling. However, the present invention is not limited to this, and may be manufactured by performing either hot rolling or cold rolling. Moreover, the conditions for hot rolling and cold rolling are not particularly limited.

(1) Austenitization Treatment

As shown in [1] and [2] of FIG. 1, the rolled material is heated to a temperature of (Ac3+30° C.) or higher to be austenitized. In order to completely austenitize and suppress the formation of the soft α-phase microstructure such as ferrite, it is necessary to heat to (Ac3+30° C.) or more. In addition, when the heating temperature of [1] is low, the prior γ grain size may be refined to promote the bainite transformation. Here, when the holding temperature of [3] described later is within an appropriate range, the bainite transformation tends to progress, and as a result, the bainite transformation progresses excessively, and the standard deviation of the equivalent circle diameter of retained austenite decreases. Therefore, from the viewpoint of suppressing this, it is necessary to heat to (Ac3+30° C.) or higher. It is preferably heated to a temperature of (Ac3+40° C.) or higher. The heating temperature is preferably (Ac3+100° C.) or less in order to more reliably suppress coarsening of crystal grains. It is more preferably (Ac3+80° C.) or less, still more preferably (Ac3+60° C.) or less. This heating temperature may be held for 1 second to 1800 seconds. Heating to the heating temperature of [1] in FIG. 1 may be performed at any heating rate, but a preferable average heating rate is 1° C./sec. or more and 20° C./sec. or less.

Here, Ac3 can be calculated by the following formula (1).

$$Ac3(°\ C.) = 910 - 203 \times [C]^{1/2} - 15.2 \times [Ni] + 44.7 \times [Si] + 104 \times [V] + 31.5 \times [Mo] + 13.1 \times [W] - 30 \times [Mn] - 11 \times [Cr] - 20 \times [Cu] + 700 \times [P] + 400 \times [Al] + 120 \times [As] + 400 \times [Ti] \quad (1)$$

"[ ]" in the above formula represents the content (% by mass) of each element, and the content of elements not included is zero.

(Refer to "Leslie Iron and Steel Materials Science", translated by Nariyasu Koda, Maruzen Co., Ltd., 1985, p. 273.)

(2) Cooling and Keeping in the Temperature Range from (Ms+10° C.) to (Ms+110° C.)

After the above austenitization, it is cooled and kept at a cooling rate of 0° C./sec. or more and 10° C./sec. or less within the temperature range from (Ms+10° C.) to (Ms+110° C.) for 10 seconds or more and less than 300 seconds, as shown in [3] of FIG. 1.

In the cooling, at least between (Ms+250° C.) and (Ms+110° C.), the average cooling rate is 15° C./sec. or more and less than 200° C./sec. This is because the formation of ferrite during cooling is suppressed by setting the average cooling rate to 15° C./sec. or more. The average cooling rate is preferably 20° C./sec. or higher, more preferably 25° C./sec. or higher. Also, by setting the average cooling rate to less than 200° C./sec., it is possible to prevent the occurrence of excessive thermal strain due to rapid cooling. The average cooling rate is preferably 150° C./sec. or less, more preferably 100° C./sec. or less. As a preferable example of such cooling, as shown in [2] of FIG. 1, cooling at relatively low average cooling rate of 0.1° C./sec. or more and 10° C./sec. or less to the quenching start temperature of (Ms+250° C.) or more, and then cooling from the quenching start temperature to the keeping start temperature of (Ms+110° C.) or less at an average cooling rate of 20° C./sec. or more and less than 200° C./sec. can be included.

Within the temperature range from (Ms+10° C.) to (Ms+110° C.), it is kept at the cooling rate of 0° C./sec. or more and 10° C./sec. or less for 10 seconds or more and less than 300 seconds. That is, in the temperature range from (Ms+10° C.) to (Ms+110° C.), the cooling rate is kept at 10° C./sec. or less for 10 seconds or more and less than 300 seconds. The state in which the cooling rate is 10° C./sec. or less includes the case where the temperature is maintained substantially constant (that is, the cooling rate is 0° C./sec.) as in [3] of FIG. 1. This keeping partially forms bainite. Since bainite has a lower carbon solubility limit than austenite, carbon exceeding the solubility limit is expelled. As a result, a region of carbon-enriched austenite is formed around the bainite. This region becomes slightly coarse retained austenite through cooling and reheating, which will be described later. By partially forming this "slightly coarse retained austenite", the standard deviation of the circle equivalent diameter of retained austenite becomes larger than 0.155 μm, and the total elongation (EL) and the uniform elongation (uEL) can be improved.

If the keeping temperature is lower than (Ms+10° C.), bainite is less likely to be formed, and thus a carbon-enriched austenite region (carbon-enriched region) is less likely to be formed around bainite. As a result, the amount of coarse retained austenite becomes insufficient (that is, the standard deviation of the equivalent circle diameter of retained austenite decreases), and the effect of improving EL and uEL becomes insufficient. The keeping temperature is preferably (Ms+15° C.) or higher, more preferably (Ms+20° C.) or higher. On the other hand, if the keeping temperature is higher than (Ms+110° C.), the soft α-phase microstructure increases and YS becomes insufficient. As a result, YR decreases. The keeping temperature is preferably (Ms+80° C.) or lower, more preferably (Ms+50° C.) or lower. In addition, when the keeping time is shorter than 10 seconds, the area of the carbon-enriched region becomes small, the amount of coarse retained austenite is insufficient (that is, the standard deviation of the equivalent circle diameter of retained austenite decreases), the EL and uEL improvement effect is insufficient. The keeping time is preferably 20 seconds or longer, more preferably 30 seconds or longer. On the other hand, if the keeping time is 300 seconds or more, the carbon-enriched region becomes too large, and not only the retained austenite but also MA becomes coarse, resulting in the decrease of the hole expansion ratio. The keeping time is preferably 200 seconds or less, more preferably 100 seconds or less. Also, if the cooling rate during the keeping is higher than 10° C./sec., sufficient bainite transformation does not occur, and therefore a sufficient carbon-enriched region is not formed, and the amount of coarse retained austenite is insufficient (that is, the standard deviation of the equivalent circle diameter of retained austenite decreases). The cooling rate during the keeping is preferably 8° C./sec. or less, and from the viewpoint of partially causing the bainite transformation, the cooling rate during the keeping is preferably 0° C./sec.

As a preferred embodiment, the temperature range of (Ms+15° C.) to (Ms+80° C.) is kept at a cooling rate of 8° C./sec. or less for 10 seconds or more, during which the temperature is maintained at a constant temperature for 3 to 80 seconds. As a more preferred embodiment, for example, the temperature range of (Ms+20° C.) to (Ms+50° C.) is kept at a cooling rate of 3° C./sec or less for 10 seconds or more, during which the temperature is maintained at a constant temperature for 5 to 60 seconds.

Here, Ms (° C.) can be calculated from the following formula (2).

$$Ms(° C.)=561-474\times[C]-33\times[Mn]-17\times[Ni]-17\times[Cr]-21\times[Mo] \quad (2)$$

"[ ]" in the above formula represents the content (% by mass) of each element, and the content of elements not included is zero.

(Refer to "Leslie Iron and Steel Materials Science", translated by Nariyasu Koda, Maruzen Co., Ltd., 1985, p. 231.)

(3) Cooling from a Temperature of (Ms+10° C.) or Higher to a Cooling Stop Temperature of Less than Ms ° C.

After the above keeping, as shown in [4] of FIG. 1, it is cooled from the second cooling start temperature of (Ms+10° C.) or higher to a cooling stop temperature of less than Ms° C. at an average cooling rate of 10° C./sec. or higher. By this cooling, the martensite transformation can occur while maintaining the carbon-enriched region (austenite region) described above. If the cooling stop temperature is higher than Ms, the amount of MA becomes excessive and YR and A decrease. In addition, if the average cooling rate is slower than 10° C./sec., the amount of carbon expelled from bainite increases during the cooling, and the carbon that has already been expelled from bainite moves farther, so the carbon-enriched region expands more than necessary. The carbon-enriched regions can be converted to both the constituent retained austenite and the untempered martensite of MA upon the cooling. For this reason, the carbon-enriched region expands more than necessary, resulting in an excessive increase in retained austenite and untempered martensite, resulting in an excessive an area ratio of MA, which reduces the hole expansion ratio.

The cooling stop temperature is preferably (Ms-300° C.) or higher and (Ms-40° C.) or lower, more preferably (Ms-260° C.) or higher and (Ms-200° C.) or lower. The average cooling rate is preferably 15° C./sec. or higher, more preferably 20° C./sec. or higher. Further, as shown in [5] of FIG. 1, it may be held at the cooling stop temperature, and a preferable holding time is 1 second to 600 seconds. Longer the holding time has little effect on properties, but the holding time over 600 seconds reduces the productivity.

(4) Reheating to a Temperature Range of (Ms-100° C.) to (Ms+125° C.)

As shown in [6] of FIG. 1, it is heated to a reheating temperature in the range of (Ms-100° C.) to (Ms+125° C.) from the cooling stop temperature described above. By this reheating, the carbon in the martensite can be expelled, the carbon concentration in the surrounding austenite can be promoted, and the austenite can be stabilized. This makes it possible to increase the finally obtained amount of MA. If the reheating temperature is lower than Ms-100° C., the diffusion of carbon is insufficient to obtain a sufficient amount of MA, resulting in the decrease of TS×EL. On the other hand, if the reheating temperature is higher than Ms+125° C., carbon precipitates as cementite and a sufficient amount of MA cannot be obtained, resulting in the decrease of TS×EL. The reheating temperature is preferably (Ms-80° C.) to (Ms+115° C.), more preferably (Ms-60° C.) to (Ms+110° C.)

As shown in [7] of FIG. 1, after reaching the reheating temperature, a temperature is preferable held on the reheating temperature, and a preferable holding time is 50 seconds or more and 1200 seconds or less. The upper limit of the holding time is more preferably 900 seconds, still more preferably 600 seconds. The heating rate up to the reheating temperature is not particularly limited. Note that "holding" does not only refer to isothermal holding, but also includes slow cooling and/or heating within the above temperature range.

In addition, the reheating may be carried out in multiple stages such as Sample Nos. 1 to 15 which will be described later. For example, the reheating may be divided into three stages in order to perform the hot dip galvanizing treatment and the alloying hot dip galvanizing treatment during holding in the reheating temperature range. Even if the reheating is performed in multiple stages, the steel microstructures are not affected at all. When the reheating is performed in multiple steps, the reheating temperature in each step may be within the temperature range of (Ms−100° C.) to (Ms+125° C.). Moreover, when heating and holding at each stage, the total holding time of each stage is preferably 50 seconds or more and 1200 seconds or less. The heating rate to the reheating temperature in each stage is not particularly limited.

After the reheating, it may be cooled to a temperature of 200° C. or less, such as room temperature, as shown in [10] of FIG. 1. A preferable average cooling rate to 200° C. or lower is 10° C./sec.

Through the steps (1) to (4) described above, the high-strength steel sheet according to the embodiments of the present invention can be obtained.

A person skilled in the art who is in contact with the method for manufacturing the high-strength steel sheet according to the embodiments of the present invention described above may obtain the high-strength steel sheet according to the embodiments of the present invention by a manufacturing method different from the above-described manufacturing method through trial and error.

Although the embodiments of the present invention are directed to a steel sheet (thin steel sheet), its product form is not particularly limited. Chemical conversion treatment, hot-dip galvanizing, electro-galvanizing, alloying hot-dip galvanizing, plating such as vapor deposition, various coatings, coating base treatments, organic coatings, and the like can also be performed for the steel sheet heat treated as described above. Electrogalvanizing, hot-dip galvanizing and alloying hot-dip galvanizing are preferably carried out as follows.

[Electrogalvanizing]

In the electrogalvanizing, the high-strength steel sheet according to the embodiments of the present invention obtained by cooling to room temperature after the above heat treatment may be electrogalvanized according to a conventional method. Electrogalvanizing may be performed, for example, by immersing the high-strength steel sheet in a zinc solution at 50° C. to 60° C. and applying an electric current. The corrosion resistance of the steel sheet is improved by applying the electrogalvanizing.

[Hot-Dip Galvanizing]

In the hot-dip galvanizing, for example, hot-dip galvanizing may be performed according to a conventional method while being held in the above reheating temperature range. In the hot-dip galvanizing, for example, the steel sheet being reheated and held may be immersed in a plating bath whose temperature is adjusted to the reheating temperature range for 1 second to 10 seconds. The corrosion resistance of the steel sheet is improved by applying the hot dip galvanizing.

[Alloyed Hot-Dip Galvanizing]

In the alloyed hot-dip galvannealing, for example, an alloyed hot-dip layer may be formed on the surface of the steel sheet by a conventional method after the hot-dip galvanizing while the steel sheet is held in the reheating temperature range. For alloying, for example, after the hot-dip galvanizing, the steel may be held so as to obtain the desired alloying in the reheating temperature range. The alloying temperature is not particularly limited, but if the alloying temperature is too low, the alloying does not proceed sufficiently. Also, the time for the alloying is not particularly limited, and may be adjusted so as to obtain the desired alloying. For example, the alloying time is preferably 10 seconds or more and 60 seconds or less. The corrosion resistance of the steel sheet is improved by applying the alloyed hot-dip galvanizing.

EXAMPLES

1. Sample Preparation

Steels with the chemical compositions shown in Table 1 below were melted. Specifically, desulfurization was performed in a ladle after primary refining in a converter. In addition, vacuum degassing by the RH method was performed after ladle refining as necessary. In the chemical compositions shown in Table 1, the balance is iron and inevitable impurities other than N, P, S and V. Ac3 (° C.) and Ms (° C.) of steels shown in Table 1 below are values calculated by the above formulas (1) and (2), respectively. In Table 1, the content of V that is not intentionally added is indicated as "''". As shown in Table 1, V is an element that is not intentionally added (that is, an inevitable impurity), and its content is 0.005% by mass or less.

After that, continuous casting was performed by a conventional method to obtain slabs. Then, after hot rolling, pickling and cold rolling were successively performed by a conventional method to produce rolled materials of 1.4 mm using an actual manufacturing machine. Thereafter, heat treatments were performed under the conditions shown in FIG. 2 and Table 2 using a plating simulator.

Figure 2:
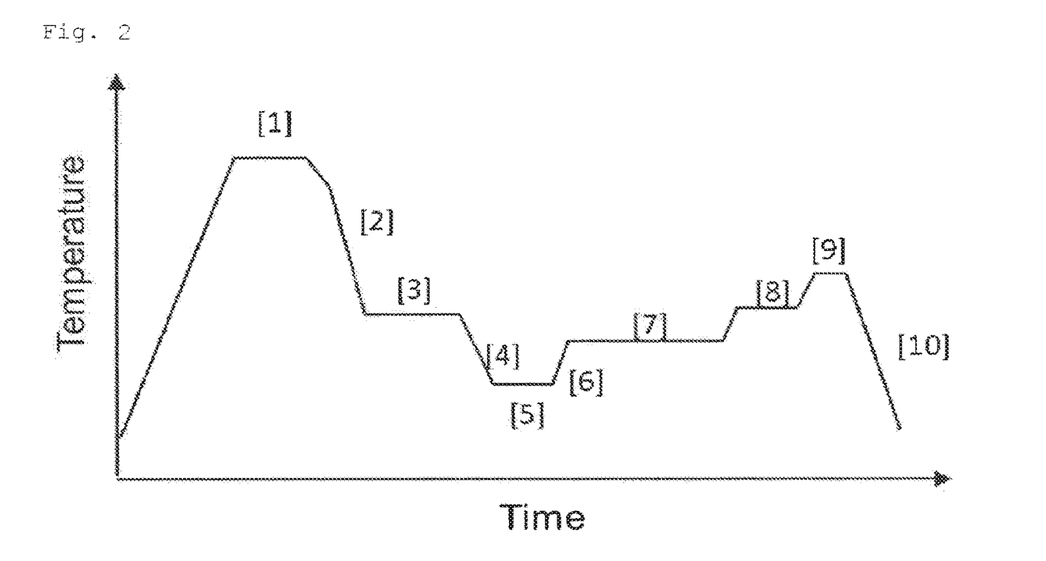
FIG. 2 is a diagram showing an example of a heat treatment pattern according to Example.

It should be noted that the numbers shown in [ ] of Table 2, such as [2], correspond to the processes with the same numbers shown in [ ] of FIG. 2. In Table 2, Sample Nos. 1 to are samples that were reheated in three stages as shown in [7], [8] and [9] of FIG. 2. On the other hand, Sample Nos. 16 and 17 are samples that were reheated only once, as shown in FIG. 1.

In Tables 2 and 3, the underlined numerical values indicate that they are out of the scope of the embodiments of the present invention. However, it should be noted that the "–" is not underlined even though it is out of the scope of the embodiments of the present invention.

TABLE 1

Chemical composition (% by mass)
* Balance being iron and inevitable impurities

| C | Si | Mn | P | S | Al | V | N | Si + Al | Ac3 (° C.) | Ms (° C.) |
|---|----|----|---|---|----|---|---|---------|-----------|-----------|
| 0.200 | 1.85 | 2.10 | 0.005 | 0.0005 | 0.040 | '0.005' | 0.0025 | 1.89 | 858 | 397 |

TABLE 2

| | [1] Heating temperature °C. | [1] Holding temperature sec | [2] Quenching starting temperature °C. | [2] Cooling rate °C./sec | [3] Holding temperature °C. | [3] Holding time sec | [4] Cooling rate °C./sec | [6] Cooling stop temperature °C. | [6] Heating rate °C./sec | [7] Reheating temperature °C. | [7] Holding time sec | [8] Reheating second temperature °C. | [8] Holding time sec | [9] Reheating third temperature °C. | [9] Holding time sec | [10] Cooling rate sec |
|---|---|---|---|---|---|---|---|---|---|---|---|---|---|---|---|---|
| No. | | | | | | | | | | | | | | | | |
| 1 | 900 | 180 | 750 | 30 | 450 | sec | 60 | 150 | 50 | 400 | 400 | 460 | 90 | 500 | 20 | 15 |
| 2 | 900 | 180 | 750 | 30 | 450 | 45 | 50 | 200 | 40 | 400 | 400 | 460 | 90 | 500 | 20 | 15 |
| 3 | 900 | 180 | 750 | 30 | 450 | 45 | 40 | 250 | 30 | 400 | 400 | 460 | 90 | 500 | 20 | 15 |
| 4 | 900 | 180 | 750 | 30 | 450 | 45 | 30 | 300 | 20 | 400 | 400 | 460 | 90 | 500 | 20 | 15 |
| 5 | 900 | 180 | 750 | 30 | 425 | 45 | 45 | 200 | 40 | 400 | 400 | 460 | 90 | 460 | 20 | 15 |
| 6 | 900 | 180 | 750 | 30 | 450 | 45 | 10 | 400 | — | 400 | 400 | 460 | 90 | 500 | 20 | 15 |
| 7 | 930 | 180 | 750 | 30 | 425 | 45 | 55 | 150 | 50 | 400 | 400 | 460 | 90 | 500 | 20 | 15 |
| 8 | 880 | 180 | 750 | 30 | 425 | 45 | 55 | 150 | 50 | 400 | 400 | 460 | 90 | 500 | 20 | 15 |
| 9 | 860 | 180 | 750 | 30 | 425 | 45 | 55 | 150 | 50 | 400 | 400 | 460 | 90 | 500 | 20 | 15 |
| 10 | 840 | 180 | 750 | 30 | 425 | 45 | 55 | 150 | 50 | 400 | 400 | 460 | 90 | 500 | 20 | 15 |
| 11 | 900 | 180 | 750 | 30 | 415 | 45 | 53 | 150 | 50 | 400 | 400 | 460 | 90 | 500 | 20 | 15 |
| 12 | 900 | 180 | 750 | 30 | 400 | 45 | 50 | 150 | 50 | 400 | 400 | 460 | 90 | 500 | 20 | 15 |
| 13 | 880 | 180 | 750 | 30 | 400 | 45 | 50 | 150 | 50 | 400 | 400 | 460 | 90 | 500 | 20 | 15 |
| 14 | 860 | 180 | 750 | 30 | 400 | 45 | 50 | 150 | 50 | 400 | 400 | 460 | 90 | 500 | 20 | 15 |
| 15 | 840 | 180 | 750 | 30 | 400 | 45 | 50 | 150 | 50 | 400 | 400 | 460 | 90 | 500 | 20 | 15 |
| 16 | 900 | 180 | 750 | 30 | 425 | 45 | 55 | 150 | 50 | 400 | 400 | — | — | — | — | 10 |
| 17 | 860 | 180 | 750 | 30 | 425 | 45 | 55 | 150 | 50 | 400 | 400 | — | — | — | — | 10 |

2. Steel Microstructures

For each sample, the fraction of MA, the fraction of the soft α-phase microstructure, and the standard deviation of the circle-equivalent diameter of retained austenite were obtained as follows. The calculation results are shown in Table 3.

[Fraction of MA]

A t/4 portion (t is the plate thickness) of the nital-corroded cross section was observed with Scanning Electron Microscope (SEM) at the magnification of 3000 or more, and a straight line with a total length A of 300 μm or more was drawn at an arbitrary position in the photograph. The fraction of MA was calculated from B/A, where B was the total of the lengths of the sections where the straight line and the MA intersect. The fraction of MA obtained in this manner is the intercept length ratio, but is equivalent to a volume ratio. In addition, in the embodiments of the present invention, a region that does not contain cementite and appears to be convex due to corrosion was identified as MA.

[Fraction of Soft α-Phase Microstructure]

The soft α-phase microstructure was obtained by creating a GAM map using the EBSD method. In the EBSD method, a 40 μm×40 μm region was measured at a measurement pitch of 0.1 μm step on a t/4 portion (t is the plate thickness) of a mirror-polished cross section. As for the analysis results by the EBSD method, only regions with the CI value of 0.1 or more were extracted and analyzed. Among the crystal grains identified by the EBSD to be α-phase (that is, the crystal structure is BCC structure), by accumulating the area of the soft α-phase microstructure with the GAM of less than 0.4 and calculating the ratio to the total area, the fraction of soft α-phase microstructure was calculated. The fraction of soft α-phase microstructure obtained in this manner is an area ratio, but is equivalent to a volume ratio.

[Standard Deviation of Equivalent Circle Diameter of Retained Austenite]

The standard deviation of the equivalent circle diameter of retained austenite was obtained by creating a Phase map using the EBSD method. Similar to the fraction measurement of the soft α-phase microstructure, the EBSD method measured a 40 μm×40 μm region at a measurement pitch of 0.1 μm step on a t/4 portion (t is the plate thickness) of the mirror-polished cross section. From the Phase map thus obtained, the area of each austenite phase (retained austenite) was obtained, and the equivalent circle diameter of each austenite phase was obtained from the area. A standard deviation was calculated from each obtained diameter and used as the standard deviation of the circle-equivalent diameter of retained austenite.

3. Mechanical Properties

[Evaluation of Tensile Properties]

The obtained sample was processed into JIS No. 5 with a parallel portion length of 60 mm, and the tensile properties were evaluated using a tensile tester under displacement control with the test speed of 10 mm/min. YS, TS, uEL and EL were measured, and YR and TS×EL were calculated. For each condition, two tensile tests were performed and the average value was evaluated. The evaluation results are shown in Table 3. In Examples, those having 780 MPa or more of TS, 0.65 or more of YR, more than 13% of uEL, 21% or more of EL, and 20000 MPa % or more of TS×EL were evaluated to be excellent in workability.

[Evaluation of Hole Expansion Ratio]

The hole expansion ratio λ was obtained according to JIS Z 2256. A punch hole with a diameter d0 (d0=10 mm) is made in a test piece, a punch with a tip angle of 60° is pushed into this punch hole, and the diameter d of the punch hole when the generated crack penetrates the plate thickness of the test piece. It was measured and obtained from the following formula (3). The calculation results are shown in Table 3. In Examples, those having λ of 20.0% or more were evaluated as having high strength and excellent workability. In Table 3, samples satisfying all the evaluation criteria for tensile properties and hole expansion rate were judged to be acceptable (OK), and samples not satisfying any of the evaluation criteria were judged to be unacceptable (NG).

$$\lambda(\%) = \{(d-d0)/d0\} \times 100 \qquad (3)$$

TABLE 3

| No. | Steel microstructure Fraction of MA % | Fraction of soft α-phase microstructure % | Standard deviation of equivalent circle diameter of retained austenite μm | Properties YS MPa | TS MPa | YR | uEL % | EL % | TS × EL MPa · % | λ % | Judgement |
|---|---|---|---|---|---|---|---|---|---|---|---|
| 1 | 13.9 | 29.4 | 0.190 | 678 | 972 | 0.698 | 15.7 | 24.3 | 23620 | 37.6 | OK |
| 2 | 14.1 | 32.3 | 0.187 | 652 | 964 | 0.676 | 15.5 | 22.9 | 22076 | 38.5 | OK |
| 3 | 12.9 | 30.0 | 0.183 | 659 | 961 | 0.686 | 17.1 | 26.1 | 25082 | 37.0 | OK |
| 4 | 12.8 | 30.5 | 0.203 | 648 | 956 | 0.678 | 16.4 | 24.2 | 23135 | 44.9 | OK |
| 5 | 8.6 | 36.0 | 0.211 | 727 | 971 | 0.748 | 14.8 | 23.1 | 22477 | 29.6 | OK |
| 6 | 18.5 | 28.1 | 0.177 | 543 | 972 | 0.559 | 15.6 | 23.3 | 22599 | 19.7 | NG |
| 7 | 9.8 | 15.2 | 0.160 | 780 | 997 | 0.782 | 13.7 | 22.4 | 22322 | 54.5 | OK |
| 8 | 10.2 | 59.9 | 0.184 | 510 | 947 | 0.539 | 18.2 | 27.4 | 25934 | 25.7 | NG |
| 9 | 13.3 | 76.4 | 0.146 | 457 | 939 | 0.487 | 21.2 | 29.9 | 28014 | 18.1 | NG |
| 10 | 8.4 | 76.4 | 0.165 | 460 | 947 | 0.485 | 21.8 | 31.6 | 29862 | 22.7 | NG |
| 11 | 6.9 | 9.9 | 0.159 | 723 | 996 | 0.726 | 14.4 | 22.5 | 22349 | 41.1 | OK |
| 12 | 6.9 | 20.4 | 0.155 | 733 | 1003 | 0.730 | 13.0 | 20.4 | 20411 | 59.9 | NG |
| 13 | 12.2 | 66.2 | 0.178 | 517 | 945 | 0.547 | 18.5 | 27.4 | 25879 | 33.4 | NG |
| 14 | 16.0 | 78.0 | 0.185 | 480 | 937 | 0.513 | 21.1 | 30.9 | 28891 | 20.2 | NG |
| 15 | 13.1 | 71.5 | 0.177 | 486 | 941 | 0.516 | 20.8 | 29.1 | 27369 | 20.5 | NG |
| 16 | 12.2 | 29.6 | 0.221 | 686 | 974 | 0.704 | 16.4 | 24.7 | 24058 | 45.8 | OK |
| 17 | 15.4 | 79.3 | 0.220 | 445 | 936 | 0.476 | 23.0 | 32.4 | 30263 | 21.8 | NG |

4. Summary

Any one of Sample Nos. 1 to 5, 7, 11 and 16, which is an example that satisfies the requirements of the embodiments of the present invention, achieves the tensile strength of 780 MPa or more, the yield ratio of 0.65 or more, TS×EL of 20000 MPa % or more, the total elongation of 21% or more, the uniform elongation of more than 13% and the hole expansion ratio of 20% or more.

On the other hand, in Sample No. 6, the cooling stop temperature was higher than the temperature range of less than Ms ° C., so the fraction of MA increased, and as a result, the YR decreased and a sufficient hole expansion ratio A was not obtained.

In all of Sample Nos. 8 to 10, 13 to 15 and 17, the heating temperatures for austenitization were lower than (Ac3+30° C.), so the fraction of the soft α phase microstructure became excessive, sufficient YS was not obtained, and YR decreased.

In Sample No. 12, after austenitization, it was kept in the temperature lower than the temperature range of (Ms+10° C.) to (Ms+110° C.), so coarse retained austenite was insufficient, and the standard deviation of the circle equivalent diameter of retained austenite decreased. As a result, sufficient uniform elongation and total elongation were not obtained.

In Sample No. 9, the soft α-phase microstructure fraction was excessively large, and the standard deviation of the circle-equivalent diameter of retained austenite was small. In Sample Nos. 13 to 15, the holding temperature of [3] is low, but the standard deviation of the circle-equivalent diameter of retained austenite satisfies the requirement. At present, the inventors consider these reasons as follows.

As described above, the more the bainite transformation progresses, the easier it is to form a carbon-enriched region, so the standard deviation of the equivalent circle diameter of retained austenite increases. However, when the bainite transformation progresses excessively, a large amount of retained austenite with high carbon concentration is formed, which can be a factor in reducing the standard deviation of the equivalent circle diameter of retained austenite.

As described above, when the heating temperature of [1] is low, the prior y grain size may be refined and the bainite transformation may be promoted. In this case, the formation of the carbon-enriched region is facilitated, which has the effect of increasing the standard deviation of the equivalent circle diameter of the retained austenite. By this effect, it is considered that Sample Nos. 13 to 15, although the holding temperature of [3] was low, satisfied the requirement of the standard deviation of the equivalent circle diameter of retained austenite.

Furthermore, as described above, if the heating temperature of [1] is too low, ferrite, which is a type of the soft α phase, is formed. In this case, the division of carbons into austenite retards the bainite transformation. That is, when the heating temperature of [1] is changed, the bainite transformation becomes the fastest in a certain temperature range. The bainite transformation is most rapid when the heating temperature of [1] is about 860° C.

In Sample No. 9, since the heating temperature in [1] above is 860° C., it is considered that the bainite transformation is greatly promoted, and the holding temperature of [3] is also set to the temperature at which bainite transformation easily progresses. Therefore, in Sample No. 9, the bainite transformation proceeded excessively (compared to Sample No. 14), and the standard deviation of the equivalent circle diameter of retained austenite was considered to be small.

Sample No. 9 had a small standard deviation of the equivalent circle diameter of retained austenite, but had good total elongation (EL) and uniform elongation (uEL). The reason for this is currently considered by the inventors as follows. As described above, since the ductility is improved when the soft α-phase microstructure is included, even if the standard deviation of the equivalent circle diameter of retained austenite is small, the total elongation (EL) and uniform elongation (uEL) may be good. Sample No. 9 had a high fraction of the soft α-phase microstructure, so the standard deviation of the circle-equivalent diameter of retained austenite was small, but the total elongation (EL) and uniform elongation (uEL) were good.

Sample No. 9 satisfied the requirement on the fraction of MA (15.0% or less), but did not satisfy the requirement on λ (20.0% or more). In Sample Nos. 14 and 17, the fractions of MA exceeded the range of the requirement (15.0% or less), but λ was within the range of the requirement (20.0% or more). At present, the inventors consider these reasons as follows.

As described above, the presence of the soft α-phase microstructure, like MA, makes it susceptible to fracture and may reduce A. Therefore, it is considered that A of Sample No. 9 which had the fraction of the soft α phase outside the range of the requirement (50% or less) was out of the range of the requirement. Further, as described above, the presence of MA causes variations in mechanical properties, so there are cases where A is satisfied even if the fraction of MA does not satisfy 15.0% or less. Therefore, Sample Nos. 14 and 17, the fraction of MA exceeded the range of the requirement (15.0% or less), but A was considered to be within the range of the requirement (20.0% or more).

This application claims priority based on Japanese Patent Application No. 2020-159167 filed on Sep. 7, 2020, the disclosure of which is incorporated by reference herein.

The invention claimed is:

1. A steel sheet, comprising:
C: more than 0.15% by mass, 0.35% by mass or less,
Si: more than 0% by mass, 3.0% by mass or less,
Mn: 1.0% by mass or more, 4.0% by mass or less,
Al: more than 0% by mass, 3.0% by mass or less,
N: more than 0% by mass, 0.01% by mass or less,
P: more than 0% by mass, 0.05% by mass or less,
S: more than 0% by mass, 0.01% by mass or less, and
total content of Si and Al: 0.5% by mass or more, 3.0% by mass or less, with the balance of iron and inevitable impurities,
wherein microstructures of the steel sheet satisfies that:
a fraction of MA in all steel microstructures is in a range of from 6.9 to 15.0% by area ratio,
a fraction of a soft α-phase microstructure in the all steel microstructures is 0% or more and 50% or less by area ratio, and
a standard deviation of an equivalent circle diameter of retained austenite is greater than 0.155 μm.

2. The steel sheet of claim 1, further comprising:
one or more selected from the group consisting of:
Cu: more than 0% by mass, 0.50% by mass or less,
Ni: more than 0% by mass, 0.50% by mass or less,
Cr: more than 0% by mass, 0.50% by mass or less,
Mo: more than 0% by mass, 0.50% by mass or less,
B: more than 0% by mass, 0.01% by mass or less,
V: more than 0.005% by mass, 0.05% by mass or less,
Nb: more than 0% by mass, 0.05% by mass or less,
Ti: more than 0% by mass, 0.05% by mass or less,
Ca: more than 0% by mass, 0.05% by mass or less, and
REM: more than 0% by mass, 0.01% by mass or less.

3. An electrogalvanized steel sheet, comprising:
an electrogalvanized layer on a surface of the steel sheet of claim 1.

4. A hot-dip galvanized steel sheet, comprising:
a hot-dip galvanized layer on a surface of the steel sheet of claim 1.

5. An alloyed hot-dip galvanized steel sheet, comprising:
an alloyed hot-dip galvanized layer on a surface of the steel sheet of claim 1.

6. An electrogalvanized steel sheet, comprising:
an electrogalvanized layer on a surface of the steel sheet of claim 2.

7. A hot-dip galvanized steel sheet, comprising:
a hot-dip galvanized layer on a surface of the steel sheet of claim 2.

8. An alloyed hot-dip galvanized steel sheet, comprising:
an alloyed hot-dip galvanized layer on a surface of the steel sheet of claim 2.

9. The steel sheet of claim 1, comprising the Al in a range of from 0.5 to 3.0%,
wherein a total content of the Si and Al is in a range of from more than 0.5 to 3.0%.

10. The steel sheet of claim 1, wherein the fraction of the MA in all the steel microstructures is in a range of from 8.6 to 15.0% by area ratio.

* * * * *